United States Patent [19]

Jefferies

[11] 4,054,809
[45] Oct. 18, 1977

[54] STATOR CORE END MAGNETIC SHIELD FOR LARGE A.C. MACHINES

[75] Inventor: Michael J. Jefferies, Schenectady, N.Y.

[73] Assignee: General Electric Company, Schenectady, N.Y.

[21] Appl. No.: 662,098

[22] Filed: Feb. 27, 1976

[51] Int. Cl.² ............................................. H02K 1/12
[52] U.S. Cl. ............................................. 310/256
[58] Field of Search .................. 310/256, 260, 270, 43, 310/45, 271; 336/84 R, 84 M

[56] References Cited

U.S. PATENT DOCUMENTS

| | | | |
|---|---|---|---|
| 1,677,004 | 7/1928 | Pohl | 310/256 |
| 1,689,187 | 10/1928 | Pohl | 310/256 |
| 3,100,271 | 8/1963 | Darrieus | 310/256 |
| 3,114,063 | 10/1963 | Karsten | 310/256 |
| 3,665,234 | 5/1972 | Bishop | 310/260 |
| 3,691,416 | 9/1972 | Drexler | 310/260 |
| 3,714,477 | 1/1973 | Gott | 310/256 |
| 3,731,127 | 5/1973 | Harrington | 310/256 |

FOREIGN PATENT DOCUMENTS

| | | | |
|---|---|---|---|
| 590,951 | 12/1933 | Germany | 310/256 |
| 1,131,791 | 6/1962 | Germany | 310/256 |
| 970,926 | 9/1964 | United Kingdom | 310/256 |

*Primary Examiner*—R. Skudy
*Attorney, Agent, or Firm*—Marvin Snyder; Joseph T. Cohen; Jerome C. Squillaro

[57] ABSTRACT

A magnetic shield to reduce stator core end heating in an A.C. machine, which may also serve as a support structure for the end-turns of the stator windings, is formed of small-diameter iron wire circumferentially wound in a matrix of fiberglass impregnated with epoxy. The iron wire provides a low magnetic reluctance path in the circumferential direction at the core end. The higher reluctance path provided by the shield in the axial direction reduces the axial magnetic flux penetrating the core end. The wire and epoxy-impregnated fiberglass matrix may also constitute a high strength support for the end-turns.

8 Claims, 1 Drawing Figure

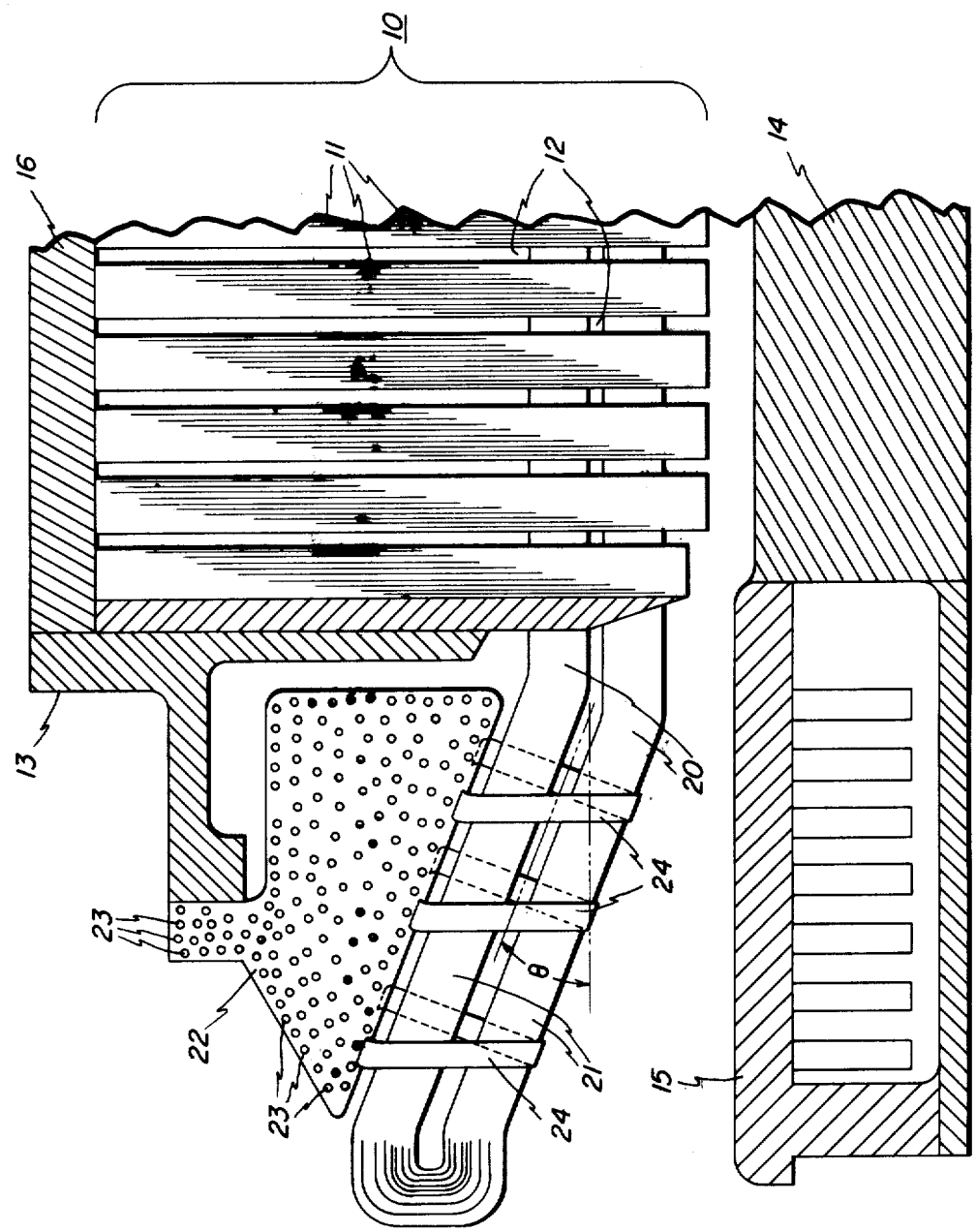

STATOR CORE END MAGNETIC SHIELD FOR LARGE A.C. MACHINES

This invention relates to high power A.C. machines, and more particularly to stator core end magnetic shielding to minimize eddy current heating in the core end caused by magnetic fields in the end-turn region.

In a large A.C. machine utilizing high magnetic flux density in the stator windings, whether the machine be a motor or generator, two functions must be accomplished in the stator winding end-turn region. First, a magnetic shield structure must be provided adjacent the stator core to minimize penetration of the core by axially-directed magnetic flux components, since axially-directed magnetic fields can detrimentally cause excessive heating of the core end. Second, a high-strength structural support must be provided for the end-turns of the machine, to prevent damage to the machine resulting from 120 Hz vibrational forces and forces due to short-circuit currents.

To reduce core end heating in large conventional A.C. machines, conducting flux shields, or apparatus for preventing magnetic flux from axially penetrating the stator core, are sometimes located at each core end to divert the axially-directed magnetic field component created by current in the end-turns. One such type of shield comprises an annulus of laminated magnetic material with the edges of the laminations presented away from the lateral face of the lamination clamping cover or end plate, as described in R. Pohl U.S. Pat. No. 1,677,004 issued July 10, 1928 and assigned to the instant assignee. Nonmagnetic support rings are typically employed to contain the magnetically-created end-turn forces in conventional A.C. machines.

Short-circuit forces in both superconducting and conventional A.C. machines are many times higher than steady-state forces therein, although they must be withstood only a few times in the machine lifetime. An iron yoke for a stator provides a strong support to withstand the short-circuit forces occurring along the active length of the machine. In the end-turn region, however, the necessary support must be provided by a different structure, due to the more complex geometry of the end-turn configuration. The present invention is directed to a magnetic shield which may also serve as an end-turn support.

Accordingly, one object of the invention is to provide a magnetic shield structure for the stator endturns of a large A.C. machine, which minimizes stator core end heating.

Another object is to provide a magnetic shield structure for the stator end-turns of a large A.C. machine in which magnetic reluctance in the circumferential direction is lower than that in the axial direction so as to furnish a preferential flux path in the circumferential direction.

Another object is to provide a high-strength support structure for the stator end-turns of a large A.C. machine, which is situated about the machine axis and exhibits low magnetic reluctance in the circumferential direction.

Briefly, in accordance with a preferred embodiment of the invention, a stator core end magnetic shield for a large A.C. machine having a rotor and having stator windings that extend, in the form of end-turns, beyond the axial end of the stator core in a longitudinal and radially-outward direction, comprises a plurality of circumferentially-wound turns of low magnetic reluctance material, the material being of small dimensions surrounding the end-turns and situated adjacent to the stator core at the axial end of the core. The low magnetic reluctance material is of sufficiently limited extent in the radial and axial directions to restrict eddy current paths therein in the radial and axial directions. Each of the stator winding end-turns is electrically insulated from each other. The volume separating each of the circumferentially-wound low reluctance turns from each other is filled with a matrix of fiberglass impregnated with epoxy, providing a structure to support a radially-outward component of force on the end-turns as the end-turns tend to spread radially outward about the rotor under the influence of magnetic forces acting on the end-turns.

BRIEF DESCRIPTION OF THE DRAWING

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which:

The single FIGURE is a longitudinal cross-sectional view of a portion of the stator core-end of a large A.C. machine which may be of the conventional or superconducting type.

DESCRIPTION OF TYPICAL EMBODIMENTS

In the FIGURE, a stator core, indicated generally at 10, is comprised of a plurality of radially-oriented thin laminations 11 of low loss, low magnetic reluctance material, such as high quality silicon steel supported in a frame 16. The laminations are compressed against each other in bundles, which are separated by air gaps 12 resulting from presence of nonmagnetic spacers (not shown) between the lamination bundles. Longitudinally-directed compressive pressure is exerted against the core laminations by a core flange 13 of magnetic material. In conventional fashion, stator 10 is situated circumferentially about rotor 14.

Armature windings 20 are positioned in slots (not shown) contained in stator laminations 11, and end-turns 21 of windings 20 extend outward from stator core 10 around rotor retaining ring 15. To avoid the necessity of extending windings 20 for an unduly large distance beyond the end of core 10, the windings are formed as involutes substantially at an angle θ from the longitudinal axis of the machine in a manner well known in the art. As a result of this armature end-turn configuration 21, a component of magnetic flux is created by the endturns and is directed parallel to the longitudinal axis of the machine, toward the major surface of laminations 11. Unlike magnetic flux from windings 20 in the region surrounding core 10 therefore, this flux component does not enter laminations 11 edgewise, but instead enters perpendicularly to the major surfaces of the laminations. Consequently, large eddy currents are induced in the laminations, creating a large amount of ohmic heating therein. Not only does this energy loss reduce efficiency of the machine, but the losses generated in the laminations in the vicinity of the stator ends may be sufficient to cause local overheating. Such condition is deleterious to operation of the machine.

To overcome the undesirable consequences of excessive eddy current generation in the stator core end laminations, a core end shield 22 may be beneficially employed. This shield is comprised of a plurality of turns of a low magnetic reluctance, small diameter wire 23, such as iron, preferably in the range of 5 to 100 mils, typically 40 or 50 mils. The wire is wound circumferentially, with each turn electrically-insulated from each other. Insulation between adjacent turns of iron wire may be provided by pre-treatment of the iron wire to provide an insulating coating, or by interleaving fiberglass fabric between layers of the iron wire. The non-magnetic or air gaps between adjacent wires in the radial and axial directions increase the reluctance of the magnetic paths in the radial and axial directions. The complete structure is impregnated with an epoxy resin, thereby forming a high-strength support annulus 22 for the stator end-turns. This annulus may be attached to core flange 13, as by bolting, and a plurality of straps 24 embedded in the epoxy/fiberglass matrix of shield 22 secure end-turns 21 against both radial and circumferential movement. Straps 24 may comprise epoxy resin-saturated fiberglass straps. Straps 24 and support structure 22 may all be cured by baking the entire end structure, as is well-known in the art.

The magnetic shield formed by structure 22 directs magnetic flux, generated by the end-turns, in a circumferential direction so as to reduce the amount of magnetic flux penetrating the major surface of the laminations 11 in an axial direction. Iron wire 23 provides a lower magnetic reluctance path in the circumferential direction than in the axial direction, since the wire is wound, preferably continuously, in the circumferential direction but is discontinuous in the axial and radial directions by virtue of the small air gaps between adjacent wires. Since structure 22 comprises many turns of small-diameter iron wire, each turn of which is electrically insulated from each other, eddy current losses in structure 22 are small. This is because the eddy current paths in annulus 22 are restricted by the limited extent of material available for conducting current in a direction orthogonal to that of the magnetic field in each turn in annulus 22. Moreover, any magnetic flux that follows the path of the iron wire through support structure 22 remains confined mainly within the interior of the wire and hence has but little effect upon stator core laminations 11. As a consequence, power losses in the A.C. machine embodying the invention are significantly reduced, so as to increase efficiency of the machine. Additionally, the temperature of laminations 11, especially at the stator core ends, is readily maintained at an acceptable level.

The foregoing describes a magnetic shield structure for the stator end-turns of a large A.C. machine, which minimizes stator core end heating. The shield exhibits a lower magnetic reluctance in the circumferential direction than in the axial direction. The shield also functions as a high-strength structural support about the machine axis for the stator end-turns.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. A stator core-end magnetic shield for a large A.C. machine having stator windings that extend, in the form of end-turns, beyond the axial end of the stator core in a longitudinal and radially-outward direction, said shield comprising:

a plurality of circumferentially-wound turns formed of a single, continuous length of low magnetic reluctance material surrounding said end-turns and situated adjacent said stator core at the axial end of said core, the material of each turn being spaced apart from the material of each other turn, said material being of sufficiently limited extent in the radial and axial directions to restrict eddy current paths therein in the radial and axial directions; and a matrix of epoxy-impregnated fiberglass filling the volume separating each of said circumferentially-wound low reluctance turns from each other, said matrix being adapted to support a radially-outward component of force on said end-turns as said end-turn tends to spread radially outward about said rotor under the influence of magnetic forces acting on said end-turns.

2. The magnetic shield of claim 1 wherein said low magnetic reluctance material comprises iron.

3. The magnetic shield of claim 1 wherein said stator core includes a flange at the axial end thereof, said magnetic shield being positioned to abut said flange.

4. The magnetic shield of claim 1 including straps affixed to said matrix and constraining said end-turns.

5. The magnetic shield of claim 4 wherein said low magnetic reluctance material comprises iron.

6. The magnetic shield of claim 4 wherein at least a plurality of said turns comprise a single, continuous wire.

7. The magnetic shield of claim 6 wherein said low magnetic reluctance material comprises iron.

8. The magnetic shield of claim 4 wherein said stator core includes a flange at the axial end thereof, said magnetic shield being positioned to abut said flange.

* * * * *